United States Patent
Kurth

(10) Patent No.: US 7,708,150 B2
(45) Date of Patent: May 4, 2010

(54) PROCESS FOR PREPARING SEMIPERMEABLE MEMBRANES

(75) Inventor: Christopher J. Kurth, Chaska, MN (US)

(73) Assignee: GE Osmonics, Inc., Minnetonka, MN (US)

( * ) Notice: Subject to any disclaimer, the term of this patent is extended or adjusted under 35 U.S.C. 154(b) by 820 days.

(21) Appl. No.: 11/220,005

(22) Filed: Sep. 6, 2005

(65) Prior Publication Data

US 2005/0284808 A1    Dec. 29, 2005

Related U.S. Application Data

(63) Continuation of application No. PCT/US2004/006484, filed on Mar. 3, 2004.

(60) Provisional application No. 60/451,761, filed on Mar. 3, 2003.

(51) Int. Cl.
    B01D 39/14    (2006.01)
    B01D 39/00    (2006.01)
    B29C 44/04    (2006.01)
    B29C 67/20    (2006.01)
    B01D 67/00    (2006.01)

(52) U.S. Cl. .......................... 210/500.38; 210/500.27; 210/490; 264/48; 264/49

(58) Field of Classification Search ............ 210/500.38, 210/490, 500.27, 653, 654, 500.37, 500.39, 210/500.41; 427/244–245; 264/41, 48–49
    See application file for complete search history.

(56) References Cited

U.S. PATENT DOCUMENTS

| | | | |
|---|---|---|---|
| 3,744,642 A | 7/1973 | Scala et al. | |
| 4,277,344 A | 7/1981 | Cadotte | |
| 4,619,767 A | 10/1986 | Kamiyama et al. | |
| 4,765,897 A | 8/1988 | Cadotte et al. | |
| 4,812,270 A | 3/1989 | Cadotte et al. | |
| 4,830,885 A | 5/1989 | Tran et al. | |
| 4,948,506 A * | 8/1990 | Lonsdale et al. | 210/490 |
| 4,948,507 A | 8/1990 | Tomaschke | |
| 4,983,291 A | 1/1991 | Chau et al. | |
| 5,021,160 A * | 6/1991 | Wolpert | 210/500.35 |
| 5,128,041 A * | 7/1992 | Degen et al. | 210/638 |
| 5,147,553 A * | 9/1992 | Waite | 210/654 |
| 5,152,901 A * | 10/1992 | Hodgdon | 210/654 |
| 5,178,766 A * | 1/1993 | Ikeda et al. | 210/652 |
| 5,614,099 A * | 3/1997 | Hirose et al. | 210/653 |
| 5,658,460 A * | 8/1997 | Cadotte et al. | 210/500.38 |
| 5,843,351 A * | 12/1998 | Hirose et al. | 264/45.1 |
| 5,922,203 A * | 7/1999 | Tomaschke | 210/500.37 |
| 6,026,968 A | 2/2000 | Hachisuka et al. | |
| 6,368,507 B1 * | 4/2002 | Koo et al. | 210/500.38 |
| 6,521,130 B1 * | 2/2003 | Kono et al. | 210/652 |
| 6,783,937 B1 * | 8/2004 | Hou et al. | 435/6 |
| 6,851,561 B2 * | 2/2005 | Wu et al. | 210/490 |
| 6,860,393 B2 * | 3/2005 | Hou et al. | 210/435 |
| 6,878,278 B2 * | 4/2005 | Mickols | 210/500.38 |
| 6,913,694 B2 * | 7/2005 | Koo et al. | 210/500.38 |
| 7,081,202 B2 * | 7/2006 | Ohara et al. | 210/500.38 |

FOREIGN PATENT DOCUMENTS

| | | | |
|---|---|---|---|
| EP | 0474370 | * | 10/1996 |
| JP | 02002827 A | * | 1/1990 |
| WO | WO2004/078328 | * | 9/2006 |

OTHER PUBLICATIONS

International Search Report for PCT/US2004/006484.

* cited by examiner

*Primary Examiner*—Ana M Fortuna
(74) *Attorney, Agent, or Firm*—Viksnins Harris & Padys PLLP

(57) ABSTRACT

The invention provides methods for preparing reverse osmosis membranes having improved permeability as well as membranes prepared by such methods.

18 Claims, No Drawings

PROCESS FOR PREPARING SEMIPERMEABLE MEMBRANES

CROSS-REFERENCE TO RELATED APPLICATIONS

This application is a continuation under 35 USC 111(a) of PCT/US2004/006484 filed Mar. 3, 2004 and published in English on Sep. 16, 2004 as WO 2004/078328 A1, which claimed priority from U.S. Provisional Application No. 60/451,761, filed Mar. 3, 2003, which applications and publications are incorporated herein by reference.

BACKGROUND OF THE INVENTION

Various techniques are used for effecting separation using asymmetric or composite membranes including selective permeation, ultrafiltration and reverse osmosis. One example of reverse osmosis separation is a desalination process in which seawater, contaminated water, or brackish water is rendered potable. Desalination of such water is often necessary to provide large amounts of relatively nonsalty water for industrial, agricultural, or home use. Such desalination can be effected by forcing water through a reverse osmosis membrane which retains the contaminants or salts. Typical reverse osmosis membranes have a very high salt rejection coefficient and possess the ability to pass a relatively large amount of water through the membrane at relatively low pressures.

Various U.S. patents describe reverse osmosis membranes and supports that are useful in industrial processes. See for example: U.S. Pat. Nos. 4,830,885, 3,744,642, 4,277,344, 4,619,767, 4,830,885, and 4,830,885.

U.S. Pat. Nos. 4,765,897 and 4,812,270 discusses polyamide membranes that are reported to be useful for water softening applications. The membranes are prepared by treating a polyamide reverse osmosis membrane with a strong mineral acid followed by treatment with a rejection enhancing agent.

Subsequently, U.S. Pat. No. 4,983,291 reported semipermeable membranes that are subjected to treatment with acids or certain acid derivatives and dried to provide a membrane that maintains high flux with a concurrent rejection loss.

Despite the above disclosures, there remains a need for reverse osmosis membranes having useful flux and retention properties. In particular, there is a need for reverse osmosis membranes that possess improved flux characteristics while maintaining useful rejection characteristics.

SUMMARY OF THE INVENTION

Applicant has discovered a method for preparing semipermeable reverse osmosis membranes having improved flux properties.

Accordingly, the invention provides a method for preparing a reverse osmosis membrane having improved flux properties comprising treating a starting reverse osmosis membrane with an ammonium salt comprising: 1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, tetraethylammonium, or diethylammonium; and 2) a suitable anion other than nitrate, borate, or perchlorate; and optionally drying to provide the reverse osmosis membrane having improved flux properties.

The invention also provides a method of improving the permeability of a reverse osmosis membrane comprising, treating a reverse osmosis membrane with an aqueous solution of an ammonium salt comprising: 1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, tetraethylammonium, or diethylammonium; and 2) a suitable anion other than nitrate, borate, or perchlorate; drying; and optionally recovering the membrane.

The invention also provides a reverse osmosis membrane prepared by a method of the invention.

U.S. Pat. No. 4,983,291 reported that the flux of a membrane could be maintained following drying by treatment with an acid selected from the group consisting of hydroxypolycarboxylic acids, polyaminoalkylene polycarboxylic acids, sulfonic acids, amino acids, amino acid salts, amine salts of acids, polymeric acids and inorganic acids prior to drying. Applicant has discovered that treatment of reverse osmosis membranes with a specific set of ammonium salts provides membranes with significantly improved flux. Additionally, the treatments of the invention do not significantly detract from the salt rejecting properties of the membrane.

The invention also provides a method for preparing a reverse osmosis membrane having improved flux properties comprising treating a starting reverse osmosis membrane with an ammonium salt comprising: (1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, tetraethylammonium, or diethylammonium and (2) subjecting the reverse osmosis membrane to post treatment.

DETAILED DESCRIPTION OF THE INVENTION

Reverse Osmosis Membranes

Reverse osmosis membranes which can be treated according to the methods of the invention include the reaction product of polyacyl halides, polysulfonyl halides or polyisocyanates and polyamines or bisphenols. The reaction product is typically deposited within and/or on a porous support backing material.

Reverse osmosis membranes can be prepared using methods that are generally known in the art, for example using methods similar to those described in U.S. Pat. Nos. 3,744, 642; 4,277,344; 4948507; and 4,983,291. Such methods entail coating an aqueous solution of a polyamine or a bisphenol, and preferably a polyamine, on a porous support backing material. Thereafter, the surface of the coated support material is optionally freed of excess amine solution and is contacted with an organic solution of a polyacyl halide, polysulfonyl halide or polyisocyanate to provide the reverse osmosis membrane, which can be utilized as a starting material in the method of the invention. These membranes may further be dried from glycerin, or drying agents disclosed in aforementioned patents.

The porous support backing material typically comprises a polymeric material containing pore sizes which are of sufficient size to permit the passage of permeate therethrough, but are not large enough so as to interfere with the bridging over of the resulting ultrathin reverse osmosis membrane. Examples of porous support backing materials which may be used to prepare the desired membrane composite of the present invention will include such polymers as polysulfone, polycarbonate, microporous polypropylene, the various polyamides, polyimines, polyphenylene ether, various halogenated polymers such as polyvinylidine fluoride, etc.

The porous support backing material may be coated utilizing either a hand coating or continuous operation with an aqueous solution of monomeric polyamines or to render the resulting membrane more resistant to environmental attacks of monomeric secondary polyamines. These monomeric polyamines may comprise cyclic polyamines such as piperazine, etc.; substituted cyclic polyamines such as methyl piperazine, dimethyl piperazine, etc.; aromatic polyamines such as m-phenylenediamine, o-phenylenediamine, p-phenylenediamine, etc.; substituted aromatic polyamines such as chlorophenylenediamine, N,N'-dimethyl-1,3-phenylenediamine, etc.; multi-aromatic ring polyamines such as benzidine, etc.; substituted multi-aromatic ring polyamines such as 3,3'-dimethylbenzidene, 3,3'-dichlorobenzidine, etc.; or a mixture thereof depending on the separation requirements as well as the environmental stability requirements of the resulting membranes.

The solution which is utilized as the carrier for the aromatic polyamine will typically comprise water in which the aromatic polyamine will be present in an amount in the range of from about 0.1 to about 20% by weight of the solution and which will have a pH in the range of from about 7 to about 14. The pH may either be the natural pH of the amine solution, or may be one afforded by the presence of a base. Some examples of these acceptors will include sodium hydroxide, potassium hydroxide, sodium carbonate, triethylamine, N,N'-dimethylpiperazine, etc. Other additives in the amine solution may include surfactants, amine salts (for example see U.S. Pat. No. 4,984,507), and/or solvents (for example see U.S. Pat. No. 5,733,602).

After coating the porous support backing material with the aqueous solution of the aromatic polyamine, the excess solution is optionally removed by suitable techniques. Following this, the coated support material is then contacted with an organic solvent solution of the aromatic polyacyl halide. Examples of aromatic polyacyl halides which may be employed will include di- or tricarboxylic acid halides such as trimesoyl chloride (1,3,5-benzene tricarboxylic acid chloride), isophthaloyl chloride, terephthaloyl chloride, trimesoyl bromide (1,3,5-benzene tricarboxylic acid bromide), isophthaloyl bromide, terephthaloyl bromide, trimesoyl iodide (1,3,5-benzene tricarboxylic acid iodide), isophthaloyl iodide, terephthaloyl iodide, as well as mixtures of di-tri, tri-tri carboxylic acid halides, that is, trimesoyl halide and the isomeric phthaloyl halides. Alternative reactants to the aromatic polyacyl halide include aromatic di or tri sulfonyl halides, aormatic di or tri isocyanates, aromatic di or tri chloroformates, or aromatic rings substituted with mixtures of the above substituents. The polyacyl halides may be substituted to render them more resistant to further environmental attack.

The organic solvents which are employed in the process of this invention will comprise those which are immiscible with water, immiscible or sparingly miscible with polyhydric compounds and may comprise paraffins such as n-pentane, n-hexane, n-heptane, cyclopentane, cyclohexane, methylcyclopentane, naphtha, Isopars, etc. or halogenated hydrocarbon such as the Freon series or class of halogenated solvents.

Treatment According to the Invention

According to the invention, a reverse osmosis membrane, for example a membrane prepared as described above, is exposed to a salt $A^+X^-$ or a mixture thereof for a period of time ranging from about 1 second to about 24 hours. The exposure of the membrane is usually affected at temperatures ranging from ambient up to about 90° C. or more and preferably at a temperature in the range of from about 20° to about 40° C.

Following exposure of the membrane, it is dried at elevated temperature (for example, up to about 170° C.) for a period of time ranging from about 30 seconds to about 2 hours or more in duration.

Membranes prepared according to the methods of the invention typically have certain specific ammonium salts in or on the membrane. Accordingly, the invention provides a reverse osmosis membrane having improved permeability that has an ammonium salt in or on the membrane and optionally in the pores of the porous support backing material.

The term "A value" in the context of the present invention represents the water permeability of a membrane and is represented by the cubic centimeters of permeate water over the square centimeters of membrane area times the seconds at the pressure measured in atmospheres. An A value of 1 is essentially $10^{-5}$ cm$^3$ of permeate over the multiplicand of 1 centimeter squared of membrane area times 1 second of performance at a net driving pressure of one atmosphere. In the context of the present invention, A values given herein have the following unit designation: $10^{-5}$ cm$^3$/(cm$^2$·sec·atm.) or $10^{-5}$ cm/(sec·atm) at 25° C.

Membranes prepared according to the methods of the invention can also be subjected to post treatment for example, to improve performance, increase stability, change fouling characteristics, modify physical properties, modify flux, or modify retention properties. Suitable post treatment methods are known in the art, see for example, Cadotte (U.S. Pat. No. 4,277,344), Jons et al. (U.S. Pat. No. 5,876,602) and Hirose et al. (U.S. Pat. No. 6,171,497). According to one embodiment of the invention, the reverse osmosis membrane can be post treated with an oxidizing agent. In another embodiment, the reverse osmosis membrane can be post treated with a chlorine source (e.g., hypochlorite).

The following examples are given for illustration and are not limiting.

EXAMPLE 1

A 0.425M solution of each tetraethylammonium salt with 1% triethylamine was applied to the face of an Osmonics AK RO membrane for 30 seconds. The solution was drained and the membrane dried at 120° C. for 8 minutes. A control was prepared as described above, without the tetraethylammonium salt. Testing was conducted at 105 psi at a concentration of 500 ppm sodium chloride. A values are reported in units of $10^{-5}$ cm/(sec·atm) at 25° C. Results for several salts are provided in Table 1.

TABLE 1

| Anion | A Value | Passage |
|---|---|---|
| Control | 22.5 | 4 |
| Chloride | 43.1 | 10 |
| Bromide | 35.5 | 9.2 |
| Iodide | 12.1 | 12.2 |
| Acetate | 44 | 15.9 |
| Trichloroacetate | 32.4 | 11.2 |
| Sulfate | 31.3 | 4.8 |
| Methanesulfonate | 39.7 | 13 |
| Phosphate | 27.3 | 7.4 |
| Toluenesulfonate | 28.8 | 5.1 |
| Acetoacetamide Anion | 38 | 12.1 |

EXAMPLE 2

A membrane prepared as in Example 1 was rolled into a spiral wound element. The element was flushed with water to remove residual chemicals, and then run on a solution containing 100 ppm NaOCl for a period of 20 minutes. Subsequent testing at 65 psig on 500 ppm NaCl gave the membrane an A value of 45 and a salt passage of 3%.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

I claim:

1. A method for preparing a reverse osmosis membrane having improved flux properties comprising treating a starting reverse osmosis membrane with an ammonium salt comprising: (1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, tetraethylammonium, or diethylammonium; and (2) a suitable anion other than nitrate, borate, or perchlorate; and optionally drying to provide the reverse osmosis membrane having improved flux properties.

2. The method of claim 1 wherein the cation is hexylammonium, ethylammonium, triethanolammonium, trimethylammonium, dimethylammonium, dipropylammonium, diisopropylethylammonium, triethylammonium, tetraethylammonium, or diethylammonium.

3. The method of claim 1 wherein the cation is tetraethylammonium.

4. The method of claim 1 wherein the anion is floride, chloride, bromide, iodide, acetate, trichloroacetate, sulfate, methanesulfonate, phosphate, toluenesulfonate, or the anion of acetoacetamide.

5. The method of claim 1 further comprising preparing the starting reverse osmosis membrane by coating a porous support backing material with an aqueous solution of a polyamine, optionally removing excess solution, and contacting the coated porous support backing material with an organic solution of a polyacyl halide, polysulfonyl halide or polyisocyanate to provide the starting reverse osmosis membrane as a condensation reaction product.

6. The method of claim 5 wherein the polyamine is an aromatic di or tri amine or a mixture thereof.

7. The method of claim 5 wherein the polyacylhalide is an aromatic di or tri acid halide.

8. The method of claim 1 wherein the starting reverse osmosis membrane has been dried prior to the treating.

9. The method of any one of claims 1 wherein the treating is carried out at a pH of greater than 8.

10. The method of any one of claims 1 wherein the treating is carried out at a pH of greater than 10.

11. A reverse osmosis membrane that has a salt in the pores of the membrane, wherein the salt comprises (1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, tetraethylammonium, or diethylammonium; and (2) an anion other than nitrate, borate, or perchlorate.

12. The membrane of claim 11 which has a porous support backing material, having pores and a salt in the pores wherein the salt comprises (1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, tetraethylammonium, or diethylammonium; and (2) an anion other than nitrate, borate, or perchlorate.

13. The membrane of claim 11 wherein the anionin is a halide, $(C_1-C_6)$alkanoate halo$(C_1-C6)$alkanoate, sulfate, $(C_1-C_6)$alkylsulfonate, phosphate, toluenesulfonate, or the anion of acetoacetamide.

14. A method for preparing a reverse osmosis membrane having improved flux properties comprising treating a starting reverse osmosis membrane with an ammonium salt comprising: (1) a cation selected from trimethylbenzylammonium, dibutylammonium, tripropylammonium, hexylammonium, ethylammonium, triethanolammonium, trimethylammonium, dimethylammonium, dipropylammonium, diisopropylethylammonium, triethylammonium, or diethylammonium and (2) subjecting the reverse osmosis membrane to a post treatment.

15. The method of claim 14 wherein the cation is hexylammonium, ethylammonium, triethanolammonium, trimethylammonium, dimethylammonium, dipropylammonium, diisopropylethylammonium, triethylammonium, or diethylammonium.

16. The method of claim 14 wherein the post treatment comprises contacting the reverse osmosis membrane with hypochlorite ions.

17. The method of claim 14 wherein the starting reverse osmosis membrane has been dried prior to the treating.

18. The method of any one of claims 14 wherein the treating is carried out at a pH of greater than 8.

* * * * *